(12) United States Patent
Schmidt (10) Patent No.: US 12,151,211 B2
(45) Date of Patent: Nov. 26, 2024

(54) ELECTRO-PRESSURE MEMBRANE METHOD FOR RECOVERY AND CONCENTRATION OF LITHIUM FROM AQUEOUS SOURCES

(71) Applicant: Aqueous Resources LLC, Denver, CO (US)

(72) Inventor: Ernst Schmidt, Denver, CO (US)

(73) Assignee: Aqueous Resources LLC, Highlands Ranch, CO (US)

( * ) Notice: Subject to any disclaimer, the term of this patent is extended or adjusted under 35 U.S.C. 154(b) by 399 days.

(21) Appl. No.: 17/862,572

(22) Filed: Jul. 12, 2022

(65) Prior Publication Data

US 2023/0014044 A1 Jan. 19, 2023

Related U.S. Application Data

(60) Provisional application No. 63/223,192, filed on Jul. 19, 2021.

(51) Int. Cl.
*B01D 61/02* (2006.01)
*B01D 11/04* (2006.01)
(Continued)

(52) U.S. Cl.
CPC .......... *B01D 61/58* (2013.01); *B01D 11/0415* (2013.01); *B01D 11/0488* (2013.01);
(Continued)

(58) Field of Classification Search
CPC .. B01D 61/027; B01D 61/422; B01D 61/423; B01D 2311/08; B01D 2311/18
See application file for complete search history.

(56) References Cited

U.S. PATENT DOCUMENTS

| 4,347,327 A | 8/1982 | Lee |
| 4,472,362 A | 9/1984 | Burba, III |
(Continued)

FOREIGN PATENT DOCUMENTS

| EP | 0365410 A1 | 12/1992 |
| JP | 2018500261 A | 1/2018 |
| WO | 2017137885 A1 | 8/2017 |

OTHER PUBLICATIONS

Mroczek, Ed, et al. "Lithium extraction from Wairakei geothermal fluid using electrodialysis." Proceedings World Geothermal Congress. vol. 2015. 2015. (Year: 2015).*
(Continued)

*Primary Examiner* — Bradley R Spies
(74) *Attorney, Agent, or Firm* — Blanchard Horton PLLC (57) ABSTRACT

A hybrid electro-pressure driven method for the recovery, purification, and concentration of lithium salts is described. A fractionating electrodialysis stack equipped with selective ion exchange membranes is s used to separate a lithium containing brine into a monovalent enriched fraction and a divalent enriched fraction. The monovalent enriched fraction is further processed to remove remaining impurities by use of pressure driven nanofiltration. An optional concentrating electrodialysis device may further concentrate the monovalent enriched fraction in lithium content. The method may be combined with a subsequent solvent extraction and electrolysis step to produce lithium hydroxide, a Li+ selective sorbent step for producing purified lithium chloride, or a Li+ selective sorbent and precipitative step to produce lithium carbonate.

33 Claims, 4 Drawing Sheets

(51) Int. Cl.
- *B01D 15/36* (2006.01)
- *B01D 61/42* (2006.01)
- *B01D 61/46* (2006.01)
- *B01D 61/56* (2006.01)
- *B01D 61/58* (2006.01)
- *B01D 69/02* (2006.01)
- *C01D 15/02* (2006.01)
- *C01D 15/08* (2006.01)
- *C25B 1/16* (2006.01)
- *C25B 15/08* (2006.01)

(52) U.S. Cl.
CPC ......... *B01D 15/361* (2013.01); *B01D 61/027* (2013.01); *B01D 61/423* (2022.08); *B01D 61/463* (2022.08); *B01D 61/56* (2013.01); *B01D 69/02* (2013.01); *C01D 15/02* (2013.01); *C01D 15/08* (2013.01); *C25B 1/16* (2013.01); *C25B 15/08* (2013.01); *B01D 2311/04* (2013.01); *B01D 2311/06* (2013.01); *B01D 2311/08* (2013.01); *B01D 2313/40* (2013.01); *B01D 2317/022* (2013.01); *B01D 2317/025* (2013.01); *B01D 2317/08* (2013.01); *B01D 2325/04* (2013.01); *B01D 2325/14* (2013.01)

(56) References Cited

U.S. PATENT DOCUMENTS

| | | |
|---|---|---|
| 4,636,295 A | 1/1987 | Ball et al. |
| 6,537,436 B2 | 3/2003 | Schmidt et al. |
| 10,899,646 B2 | 1/2021 | Schmidt |
| 2020/0189925 A1 | 6/2020 | Featherstone et al. |
| 2020/0306696 A1 | 10/2020 | Wang et al. |

OTHER PUBLICATIONS

Jin, Ke-Yong et al—CN 209483655U and FIT Translation—Nov. 5, 2019 (Year: 2019).*

Astom Corperation, "Product Catalogue; Ion Exchange Membranes / Electrodialyzers, Diffusion Dialyzers", Product Information Sheet, http://www.astom-corp.jp/en/catalog/index.html, Mar. 2022, 20 Pages.

De Nora, "De Nora electrodic package for Alkaline Water Electrolysis", Product Information Sheet; https://denora.com/dam; DN-Etek—Apr. 2016, Copyright 2016 Industrie De Nora S.p.A., Apr. 2016, 9 Pages.

Dupont, "FilmTec Membranes-NF90-PDS-45-D01520", https://www.dupont.com/products/filmtecnf904040.html, Form No. 45-D01520-en, Rev. 5., Aug. 2021, 3 Pages.

Dupont, "Product Data Sheet: FilmTec Membranes—NF270-PDS-45-D01529", Form No. 45-D01519-en, Rev. 6, https://www.dupont.com/products/filmtecnf2702540.html, Aug. 2022, 3 Pages.

Excell Membranes, "Product Information Sheet", SnowPure Water Technologies San Clemente, CA, USA, www.snowpure.com/products/excellion, Jan. 2018, 1 Page.

GE Power & Water, "Water & Process Technologies Duraclick* Series Fact Sheet", Low Fouling NF/RO Elements, https://www.lenntech.com/Data-sheets/Duraslick-Series-L, Apr. 2015, 2 Pages.

INEOS Electrochemical Solutions, "BICHLOR™ Electrolyser State-of-the-art chlor-alkali production technology", https://www.ineos.com/businesses/ineos-electrochemical-solutions/products/bichlor-electrolyser, INEOS Technologies Ltd, May 19, 2021, 8 Pages.

Lennetech, "Water Treatment Solutions; Fact Sheet", DuraSlick* NF Series, https://www.lenntech.com/cgi-in/search.cgi?q=DuraSlick+NF+Series&language_id=1&project_id=1&searchmode=bool, Sep. 11, 2017, 2 Pages.

Mega, "Ralex Membrane, AMHPES—Product Data Sheet", PDS-DMP/RALEX® Membrane AMHPES; EN/19/10, p. 5 and 6, https://www.mega.cz/membranes, Nov. 1, 2019, 2 Pages.

Mega, "Ralex Membrane; CMHPES—Product Data Sheet", PDS-DMP/RALEX® Membrane Cmhpes; EN/19/10, www.mega.cz/membranes, pp. 9 and 10, Nov. 1, 2019, 2 Pages.

Nafion, "Genera; Bulletin G-05 Ion Exchange Materials", Introduction to Nafion, https://www.nafion.de/-/media/files/nafion/nafion-introduction-g-05.pdf, C-11233, Mar. 2017, 2 Pages.

* cited by examiner

ELECTRO-PRESSURE MEMBRANE METHOD FOR RECOVERY AND CONCENTRATION OF LITHIUM FROM AQUEOUS SOURCES

REFERENCE TO RELATED APPLICATIONS

This application claims the benefit of U.S. Provisional Application No. 63/223,192 entitled "Electro-Pressure Membrane Process and Method for Recovery and Concentration of Lithium Chloride from Aqueous Sources" filed Jul. 19, 2021, which is incorporated by reference in its entirety, except that in the event of any inconsistent disclosure or definition from the present application, the disclosure or definition herein shall prevail.

BACKGROUND

Lithium can be extracted from raw sources consisting of mineral ores and brines. Aqueous lithium mining from naturally occurring brines and salt deposits is advantageous compared to extraction from minerals, since mining from naturally occurring brines and salt deposits may be considered more environmentally friendly and cost-effective than extraction from minerals. However, the lithium concentration in brines is highly variable in view of the brine source. For example, the salt encrusted depressions in Chili have a high lithium concentration that can exceed 1,000 parts-per-million (ppm) while geothermal brines in the Salton Sea region are comparatively low at 250 ppm. Oilfield brines often have lithium concentrations ranging from 70-350 ppm. The continued demand for lithium can only be met by increased production. However, it is not desirable for such increased production to result in an associated increase in non-sustainable mineral mining practices.

Lithium is conventionally extracted from concentrated brines in desertic environments by an extremely slow and relatively inefficient methodology consisting of brine evaporation in open air ponds where the different brine salts precipitate sequentially, with lithium carbonate being recovered from a concentrated brine at the end of the evaporation process. It is generally believed that naturally occurring concentrated lithium brines are formed by solar and wind brine evaporation, as naturally occurring concentrated lithium brines have a $Li^+$ concentration at least three times higher than the $Li^+$ concentration of naturally occurring non-concentrated s brines. However, lithium extraction from these concentrated brines is chemically intensive and produces large waste volumes. Such conventional evaporitic technology also is heavily dependent on the geological structure of the lithium deposits, brine chemical composition, climate, and weather conditions.

The presence of impurities in lithium brines must be kept to a minimum during concentration, or the concurrent concentration of impurities with the $Li^+$ may result in a concentrated brine where it is very difficult or impossible to separate the $Li^+$ from the impurities. Normally, the concentrated brine must have lower than 0.5% impurities by weight. This is especially true for impurities such as magnesium and calcium, which can otherwise co-precipitate with lithium. Because lithium and magnesium salts have similar chemistries, the lithium is difficult to separate from any magnesium present in the brine deposit. The higher the Mg/Li ratio of the brine, the more expensive it is to separate the magnesium from the lithium in the production process.

Another frequent impurity that appears in natural brines including lithium salts is boron. In the production of metallic lithium by the electrolysis of fused salts, the boron must be eliminated before production of the purified lithium chloride, since otherwise the boron would accumulate in the electrolyte, thus lowering its conductivity with a subsequent decrease in production capability of the electrolysis cells. Therefore, the elimination of impurities from natural brines requires that any boron is removed before the calcium and/or magnesium. Otherwise, the boron later precipitates with the lithium carbonate in the form of lithium borate or lithium tetraborate, which is difficult to eliminate later from the lithium carbonate.

Conventional purification of natural brines through fractionated crystallization (sequential crystallization using a series of evaporitic ponds) has proven to be a costly process yielding relative low amounts of lithium. Such fractionated crystallization also has difficulty eliminating boron, magnesium, and calcium from the lithium that can be recovered from the concentrated brine (2,500 ppm lithium concentration or greater). Conventional non-evaporitic lithium capture methodologies have the advantage of potentially being applicable to more dilute lithium brines, such as geothermal or oilfield brines that have been coined "petrolithium" brines, in relation to evaporative technologies. However, conventional non-evaporitic methodologies are much more energy intensive than the evaporitic technologies.

In addition to the desired lithium salts, brines are also host to potash, iodine, and numerous other minerals and metals. The simultaneous recovery of other valuable components from the brine, in addition to lithium salts, would be advantageous to not only reduce the amount of waste generated from lithium salt recovery, but to increase the cost effectiveness of the process through additional valuable material recovery. It also would be advantageous to eliminate the need to carry large amounts of chemicals to isolated locations, thus reducing the amount of chemical waste generated at the isolated location that must then be carried back or dumped.

As can be seen from the above description, there is an ongoing need for simple and efficient materials and methods for recovering lithium salts from brines. The present invention avoids or ameliorates at least some of the disadvantages of conventional evaporative and non-evaporitic techniques for recovering lithium from brines.

SUMMARY

In one aspect, the invention provides a method of recovering and concentrating lithium from aqueous sources, where the method comprises processing a brine with a pretreatment to produce a pretreated brine; processing the pretreated brine through a fractionating electrodialysis device to produce a monovalent depleted diluate depleted in lithium chloride and a monovalent enhanced concentrate concentrated in lithium chloride; treating the monovalent enhanced concentrate with acid to produce an acidified monovalent enhanced concentrate; processing the acidified monovalent enhanced concentrate through a nanofiltration to produce a nanofiltration permeate and a nanofiltration reject; and producing a monovalent enriched concentrate enriched in lithium from the nanofiltration permeate.

In another aspect of the invention, the method also comprises passing the nanofiltration permeate to a salt depleting tank of a concentrating electrodialysis device to further concentrate the nanofiltration permeate in monovalent ions.

In another aspect of the invention, the method also comprises feeding the monovalent enriched concentrate to a solvent extraction step, where the solvent extraction step uses an organic phase solvent that selectively binds lithium cations in relation to competing monovalent cations.

In another aspect of the invention, the method also comprises feeding the nanofiltration permeate through a selective sorbent and from the selective sorbent to the salt depleting tank.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the claims that follow. The scope of the present invention is defined solely by the appended claims and is not affected by the statements within this summary.

BRIEF DESCRIPTION OF THE FIGURES

The invention can be better understood with reference to the following drawings and description. The components in the figures are not necessarily to scale, emphasis instead being placed upon illustrating the principles of the invention.

DETAILED DESCRIPTION

A hybrid electro-pressure driven method for the recovery, purification, and concentration of lithium salts is described. A fractionating electrodialysis stack equipped with selective ion exchange membranes is used to separate a lithium containing brine into a monovalent enriched fraction and a divalent enriched fraction. The monovalent enriched fraction is further processed to remove remaining impurities by use of pressure driven nanofiltration. An optional concentrating electrodialysis device may further concentrate the monovalent enriched fraction in lithium content.

The method may be combined with a subsequent solvent extraction and electrolysis step to produce lithium hydroxide, a $Li^+$ selective sorbent step for producing purified lithium chloride, or a $Li^+$ selective sorbent and precipitative step to produce lithium carbonate. The lithium may be recovered from the monovalent enriched concentrate or a lithium enriched concentrate in other ways. As the method is chiefly electrical, as opposed to chemical, the method reduces the amount of liquid waste and may be solar powered in desertic locations. As the method recovers and concentrates lithium, the method also may be used to remove lithium from pegmatite ore and sedimentary clay leachates, for example.

Brines that can be processed according to the method include continental brines, natural brines, oilfield brines, geothermal brines, and intermediate solutions and brines obtained in the processing of ores. Such brines contain varying amounts of monovalent cations including lithium, sodium, and potassium; multivalent cations including calcium and magnesium; and anions including sulfate, borate, and chloride. Such brines have a potential recoverable lithium value down to 100 ppm.

Figure 1:
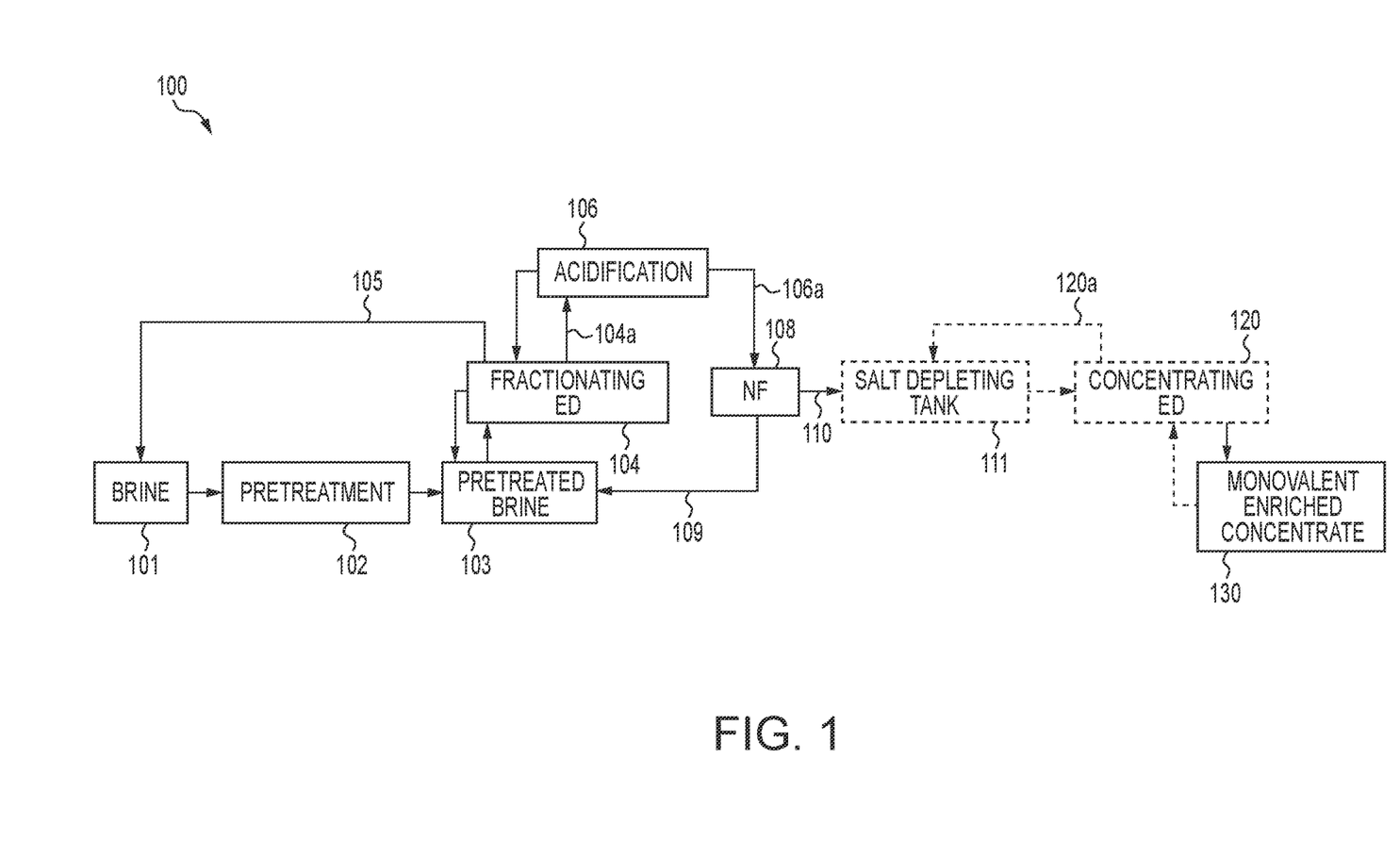
FIG. 1 represents a process flow diagram illustrating a method 100 for producing from a brine a monovalent ion enriched concentrate, where the lithium cation constitutes an enhanced portion of the monovalent ions in the concentrate in relation to the brine.

FIG. 1 represents a process flow diagram illustrating a method 100 for producing from a brine 100 a monovalent ion enriched concentrate 130, where the lithium cation constitutes an enhanced portion of the monovalent ions in the concentrate 130 in relation to the brine 100. The brine 101 is first subjected to a pretreatment 102 to produce pretreated brine 103.

During the pretreatment 102 the concentration of contaminants in the brine 101 is reduced. Contaminants include iron and potentially heavy metals and may also include silica, silicates, hydrocarbons, and halogens depending on the source of the brine 101. Direct lithium extraction using a selective adsorbent or ion exchange resin, precipitations, and the like may be performed during the pretreatment 102. The pretreatment 102 is preferably implemented in response to the source, contaminant types, and contaminant concentration of the brine 101.

As an example, for continental and natural brines, the pretreatment 102 preferably includes pH adjustment, iron oxidation, preferably by aeration, and filtration to remove insoluble particles.

As another example, for geothermal brines, the pretreatment 102 preferably includes the removal of scaling constituents (mainly iron silicates and amorphous silica). Such scaling constituent removal typically includes routing the brine through a series of reactor clarifiers to reduce the silica concentration. The reactor clarifiers precipitate silica, along with iron and lesser concentrations of arsenic, barium, and lead. Additional detail regarding appropriate reactor clarifiers may be found in U.S. Pat. Pub. 2020/0189925 A1, filed Feb. 21, 2020, entitled "Process for Recovery of Lithium from a Geothermal Brine.

As another example, for oilfield brines, the pretreatment 102 includes the removal/recovery of hydrocarbons, often using gravity phase separations. Preferably, after hydrocarbon phase removal, oil and gas produced brines may be oxidized, pH adjusted, and filtered to deny passage of insoluble particles. One method of appropriately pretreating oilfield brines may be found in U.S. Pat. No. 10,899,646 B2, entitled "Methods of Separating and Isolating Water and Other Desired Constituents from Oilfield Produced Brines for Reuse", filed Feb. 26, 2019.

As another example, Smackover formation brines are rich in bromine and other halogen ions that may be recovered during the pretreatment 102 with chlorine and steam in the case of bromine and activated carbon adsorption for iodine.

The pretreated brine 103 from pretreatment 102 is then fed to fractionating electrodialysis device (FED) 104. The FED 104 redistributes cations and anions of the pretreated brine 103 between alternating membranes. The FED 104 includes a pair of electrodes (anode and cathode) and multiple membranes, with at least a first electrodialysis membrane being a monovalent anion-selective membrane and a second electrodialysis membrane being a monovalent cation-selective membrane. Monovalent selective membranes which reject multivalent ions from passing through the membrane in the FED 104 result in overall lower energy consumption, faster extraction/concentration rates, and specific monovalent/multivalent ion separation as the smaller monovalent ions are transported through the membranes faster than the multivalent ions.

Preferably, alternating anion-permeable and cation-permeable membranes are disposed between the anode and the cathode to form a series of alternating dilute and concentrate channels between the alternating membranes within the FED 104. The anion-permeable membranes allow the passage of anions, while the cation-permeable membranes allow the passage of cations. In combination, these membranes separate the pretreated brine 103 into a diluate that is depleted in lithium chloride and a concentrate that is concentrated in lithium chloride. Suitable FED's are sold under the Acilyzer ED name may be obtained from Astom, Japan, for example.

The FED 104 preferably is operated in a "shallow batch mode" where a fixed volume of the pretreated brine 103 fed into the FED 104 is recirculated back to the pretreated brine 103 until the desired degree of salt separation is achieved within the FED 104.

Weakly ionized species (e.g., dissolved silica and boron) are not transported across the ion-exchange membranes of the FED 104. At a pH of 7, boron is present in the form of boric acid. The lack of charge and small size of the boric acid molecule results in substantially no transport, thus, boron remains in the multivalent fraction/compartment of the FED 104 along with the calcium, magnesium, and other multivalent metals.

The FED 104 produces a monovalent enhanced concentrate stream 104a that is acidified in acidification 106. Preferably, the acidification 106 relies on a mineral acid, more preferably hydrochloric acid (HCl). During the acidification 106, the pH of the monovalent enhanced concentrate stream 104a is preferably maintained from pH 3 to pH 6 to reduce scaling. Alternatively, to a mineral acid, carbon dioxide gas may be used to provide all or a portion of the acidification 106.

The FED 104 also produces a monovalent depleted diluate stream 105 that may be returned or reinjected to the source of the brine 101. Thus, the monovalent depleted diluate stream 105 may be pretreated along with unprocessed brine. Alternatively, valuable multivalent metals, such as magnesium, may be recovered from the monovalent depleted diluate stream 105. As the method 100 concentrates multivalent metals in the monovalent depleted diluate stream 105, the enhanced magnesium ion content of the monovalent depleted diluate stream 105 may result in the monovalent depleted diluate stream 105 being competitive with magnesite as a feedstock for magnesium metal recovery.

The monovalent ion selective membranes of the FED 104 are not 100% effective at rejecting multivalent ions from the monovalent enhanced concentrate stream 104a. Thus, preferably, the acidified monovalent enhanced concentrate stream 106a is fed to nanofiltration (NF) 108. The NF 108 may be operated in batch recirculation, permeate staging and/or concentrate staging configurations. The NF 108 produces a NF permeate 110 and a NF reject 109. The NF reject may be returned to the pretreated brine 103 for further separation and recovery by the FED 104.

The NF 108 membrane is structurally like a reverse osmosis (RO) membrane, however, unlike RO membranes, the NF 108 membrane is characterized by a larger pore size in the "skin layer" and a net negative electrical charge inside the individual pores of the NF membrane. This negative charge is responsible for rejection of anionic species, according to the anion surface charge density. Accordingly, divalent anions, such as sulfate ($SO_4$), are more strongly rejected than monovalent anions, such as Cl—. Thus, the nanofiltration permeate is depleted in divalent anions in relation to the nanofiltration reject which is enriched in divalent anions.

Preferable NF 108 membranes are spiral-wound and exhibit high $MgSO_4$ rejection. Suitable NF 108 membranes are available from Dow as part of the FILMTEC™ NF270 series, Dupont Water Solutions as part of the NF90 series, GE/Osmonics as part of the Duraslick NF8040 series, and Suez as part of the NF404090 series, for example.

The NF permeate 110 is then optionally fed to a salt depleting tank 111 of an optional concentrating electrodialysis device (CED) 120 for further concentration of the purified NF permeate 110. Depending on the constituents of the pretreated brine 103, the additional CED processing may not be required. When used, the NF permeate 110 flows from the salt depleting tank 111 of the CED 120 to the CED 120. The salt depleting tank 111 may be physically separated from the CED 120 or integral to the CED 120.

The CED 120 uses a two ion exchange membranes per cell pair assembly and more than one of the cell pair assemblies to increase the area of the ion exchange membranes. The membranes used in the CED 120 preferably are standard ion-exchange, thus non-monovalent selective, membranes. Generally, a series of anion and cation exchange membranes are arranged in an alternating pattern between an anode and a cathode, to form individual cells in a stack.

The feed stream from the salt depleting tank 111 is pumped through the narrow cell compartments of the CED 120 and an electrical potential is established between the electrodes. The positively charged cations in the solution migrate toward the cathode and the negatively charged anions migrate toward the anode. The overall result is an enriched salt concentration in alternate compartments, while the other compartments simultaneously become depleted of ions. Salt depleted solution 120a is generally referred to as a diluate stream and may be returned to the salt depleting tank 111.

The enriched salt solution formed by the CED 120 is a monovalent enriched concentrate 130 including lithium chloride (LiCl) and sodium chloride (NaCl), which all or a portion of may be optionally passed back to the CED 120 in the case additional monovalent enrichment is desired. The monovalent enriched concentrate 130 is enriched in lithium cations in relation to the brine 101. Preferably, the lithium concentration of the monovalent enriched concentrate 130 is increased to a lithium concentration of at least twice that of the brine 101 and has a total salt concentration from 1.1 kg/L to 1.2 kg/L.

Heterogeneous ion exchange membranes useful for the CED 120 to concentrate brines to near saturation preferably have higher crosslinking and thickness in relation to homogenous ion exchange membranes used for desalination. Heterogeneous membranes that are sufficiently crosslinked to restrict water transport are referred to as "tight" membranes with low water transport. Since membrane selectivity and salt fractionation at this stage of the method 100 are no longer required, heterogenous type membranes that are not ion selective are preferred for use in the CED 120.

CED process stacks (not shown) are generally built of membrane sheets separated from each other by suitably configured gaskets. For efficient separations, the distance (gap) between the sheets is as small as possible. In most designs, a spacer is introduced between the individual membrane sheets, both to assist in supporting the membrane and to help control the liquid flow distribution.

The CED process stacks are typically assembled in the same fashion as a plate-and-frame filter press, the gaskets corresponding to the frames and the membrane sheets corresponding to the plates. The CED process stack includes flow channels for distribution of liquids to be treated in each of various layered compartments which are formed by patterns of mating holes and slots through the gaskets and the membranes prior to assembly of the CED process stack. Additional detail regarding the construction and arrangement of CED stacks that may be useful in constructing CED 120 may be found in U.S. Pat. No. 6,537,436, filed May 31, 2001, entitled "System for Electrodialysis Treatment of Liquids" and in EP Pat. Pub. No. EP 0 365 410 A1, filed Oct. 13, 1989, entitled "Space Plate for a Fluid Exchange Apparatus", for example.

Water transport across the membranes of the CED 120 is caused by osmosis and electro-osmosis. Osmotic transport is the result of the concentration difference between the two solutions separated by a membrane. Electro-osmosis refers to the hydration shell of the ions migrating through the membrane. Ions that are transported through the membrane by an electric potential can drag along about five water molecules on the average. The amount of water transport depends on the membrane properties (for example, a high degree of cross-linking in the membrane reduces water transference), temperature, electric current, stirring rate/turbulence of the solution, and the percentage of water in the solution.

Suitable heterogeneous low water transport membranes for use in the CED 120 include: the Ralex MH-PES and CM-PES membranes available from Mega a.s., Czech Republic; and the EXCELLION™ MI-100 and MI-200 membranes available from Snowpure Water Technologies, USA, for example. Alternatively, or additionally, highly cross-linked homogenous membranes that are monovalent selective, thus like those present in the FED 104, also may be used if the concentration difference between the depleting and enriching compartments are kept to a minimum. This is accomplished by concentrate staging, thus using more than one ED stack in a series. However, the increased cost of the monovalent selective membranes makes them less preferred for use in the CED 120.

The electro-pressure membrane lithium recovery method 100 as implemented using the FED 104, the NF 108, and the CED 120 relies substantially on electricity as opposed to chemical reagents that must be transported to the processing site. Thus, the process may be effectively powered by solar energy. The desertic regions, where brines with recoverable lithium concentrations are often found, are mostly rich in solar energy. When the method 100 is powered with solar energy, the method 100 eliminates the dependence on grid power while minimizing the carbon footprint.

As the method 100 requires electricity, the electricity is preferably provided by a combination of photovoltaic (PV) cells and batteries that can meet the power supply profile of the electrical load. Much of the electric usage of the method 100 is used to drive ion movement within the FED 104 and the CED 120 in the form of DC power. Renewable energy sources such as solar and wind generate DC power. For normal PV power generation, DC power is typically inverted to AC for grid compatibility, resulting in a 20-30% power loss. The fact that the FED 104 and the CED 120 run on un-altered DC power means that a PV-driven system can be considered more energy efficient.

Figure 2:
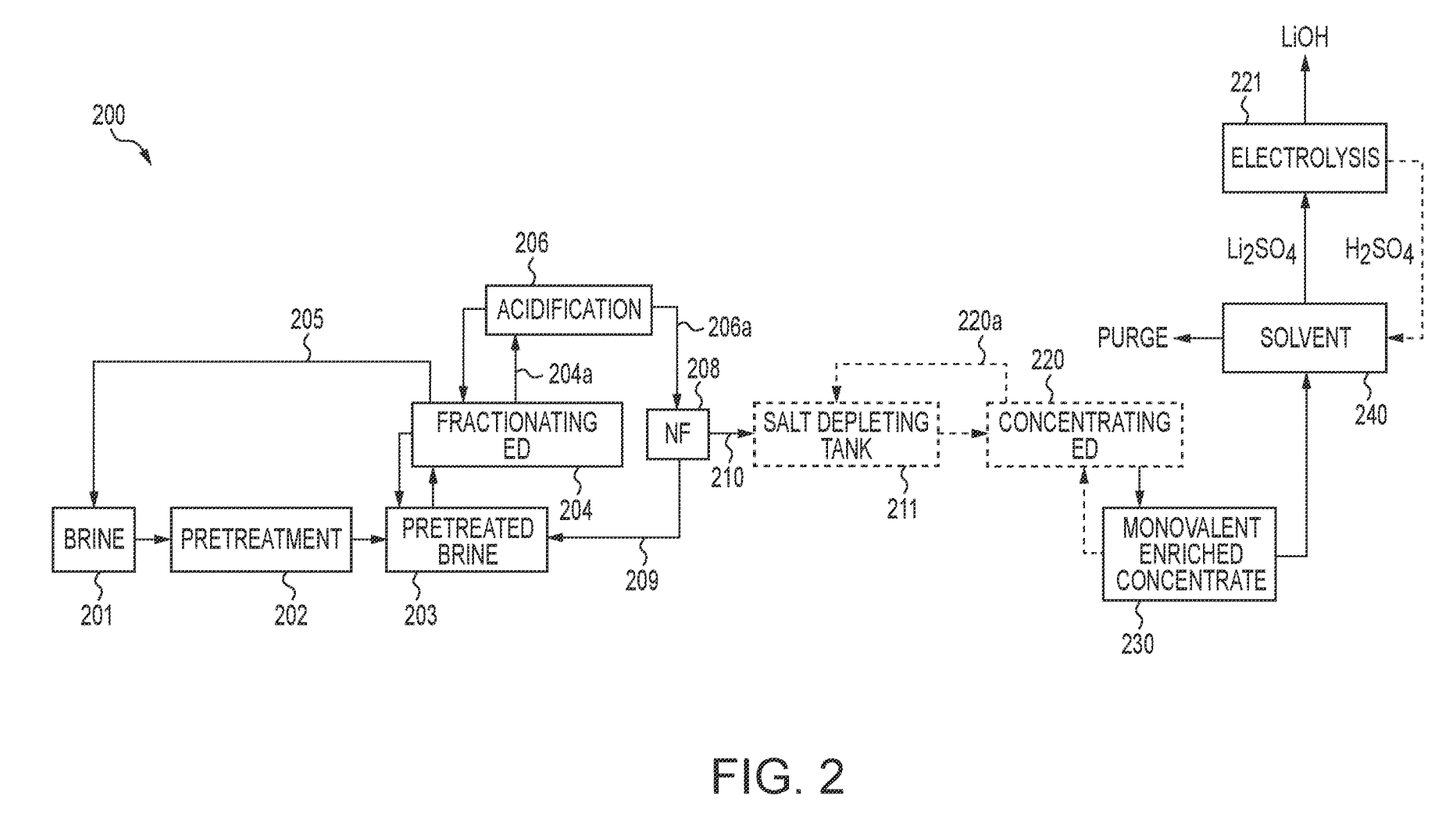
FIG. 2 represents a process flow diagram illustrating a method for producing purified lithium hydroxide from a brine using an organic phase solvent and electrolysis.

FIG. 2 represents a process flow diagram illustrating a method 200 for producing purified lithium hydroxide from a brine using an organic phase solvent and electrolysis. In FIG. 2, the monovalent enriched concentrate 230 including lithium chloride and sodium chloride as previously described in the context of FIG. 1 is fed to a solvent extraction step 240 using an organic phase solvent that selectively binds lithium cations over competing monovalent cations, such as sodium and potassium cations. Thus, during the solvent extraction step 240, lithium cations are selectively extracted from the monovalent enriched concentrate 230 into an organic phase of the extraction solvent. While not wishing to be bound by any particular theory, this is believed to occur by the lithium cations selectively forming an organometallic complex with the organic solvent molecules.

Organic phase solvent extractants applied by the mining and metallurgy industry typically contain multiple components, including an extractant (a metal chelating or binding reagent), a co-extractant (an adduct forming synergistic reagent), and a diluent (a bulk solvent). Example diluents are kerosene, xylene, and alkanes, such as dodecane. Extractants may include neutral species, such as ketones, beta-diketones, or ionizable species, such as organophosphates. Extractants may have a variety of ionizable functional groups, including carboxylic acid, phosphoric acid, or amines. A variety of organic and inorganic compounds, such as tri-n-octyl phosphine oxide (TOPO) or ferric chloride, may serve as synergistic adducts. In some cases, extractants, such as bis-2,4,4-trimethyl pentyl phosphinic acid (Cyanex 272), are used alone. More frequently, synergistic mixtures, such as di-2-ethylhexylphosphoric acid (D2EHPA) and TOPO, are applied together to enhance selectivity or recovery efficiency.

Commercially manufactured organic phase solvent extractant reagent mixtures (e.g., LIX 54) may also be used for the separation of lithium from sodium in aqueous solution. For example, Pranolo et al. used LIX 54 and Cyanex 923 in ShellSol D70 diluent for lithium extraction with an efficiency of approximately 97% at pH 11 and a lithium to sodium separation factor of 1560. In this example, lithium recovery was achieved with a 0.5 M HCl strip solution (Pranolo, Y.; Zhu, Z. W.; Cheng, C. Y., *Separation of lithium from sodium in chloride solutions using SSX systems with LIX* 54 *and Cyanex* 923, Hydrometallurgy, 2015, 154, 33-39).

The organic phase of the extraction solvent including extracted lithium cations is preferably stripped with sulfuric acid to convert lithium chloride (LiCl) to lithium sulfate ($Li_2SO4$) and then subjected to electrolysis 221 to provide the desired lithium hydroxide salt in addition to recovering the sulfuric acid. The sulfuric acid then may be transferred back to the solvent extraction step 240 for continued use. The optional sulfuric acid stripping prior to the electrolysis 221 reduces unwanted chlorine gas production from lithium chloride during the electrolysis 221. The purge stream is a sodium/potassium chloride brine relatively free of impurities.

The concentration of sodium and/or potassium ions in the solvent extract from the solvent extraction step 240 preferably is less than 5% by weight, more preferably less than 3% by weight as desirable for electrolysis. The monovalent enriched concentrate 230 is substantially free of ions that may interfere with electrolysis, such as cations of iron, calcium, and/or magnesium. Thus, cations such as iron, calcium, magnesium, if at all present, preferably have a total concentration of less than 0.001% by weight, and even more preferably less than 0.00001% by weight, in the monovalent enriched concentrate 230.

The electrolysis 221 includes an electrolysis cell having at least one anode, one cathode, and a permeable membrane, for the electrochemical preparation of lithium hydroxide. Electrolysis cells suitable for large scale production are commercially available from companies, such as, Ineos, DeNora, Chlorine Engineers, and Asahi Glass. Specifically, chloride ions are oxidized to chlorine at the anode and water is reduced to hydroxide ions and hydrogen gas at the cathode.

The cathode of the electrolysis cell can be nickel, catalyzed nickel mesh, stainless steel, coated stainless steel, and mild steel. Other cathodes can include mixed ruthenium compounds, platinum, and the like that have low hydrogen over potential. The total area of the electrolysis cell cathode can be adjusted based upon cell size and desired production.

The anode of the electrolysis cell can be titanium mesh coated with ruthenium oxide, titanium mesh coated with platinum, carbon, or the like. Preferably, the anode is dimensionally stable, allowing for reduced power consumption. Dimensionally stable titanium anodes are particularly well suited for chlorine environments as the titanium substrate is resistant to corrosion. The total area of the electrolysis cell anode can be adjusted based upon reactor size and desired production. The anolyte of the cell can be a lithium chloride solution having a lithium chloride concentration of 1% by weight to saturation, preferably from 10% to 35% lithium chloride by weight.

The membrane of the electrolysis cell can be any suitable semi-permeable cation selective membrane that selectively passes cations and inhibits the passage of anions. One exemplary membrane is Nafion (E.I. DuPont de Nemours & Co.), particularly the Nafion 300, 400 and 900/9000 series of materials. The membrane may be placed between the anolyte being electrolyzed and the catholyte. Additional information regarding useful electrolysis cells and techniques for their use may be found in Int. Pub. No. WO 2017/137885 A1, filed Feb. 7, 2017, entitled "Integrated Lithium Production Process".

The electrolysis 221 may be replaced with a bipolar membrane electrodialysis system in the event lithium hydroxide production is desired s without the co-production of chlorine. However, this is not preferred because the bipolar membrane electrodialysis system cannot produce the higher lithium hydroxide concentrations available from the electrolysis 221.

Figure 3:
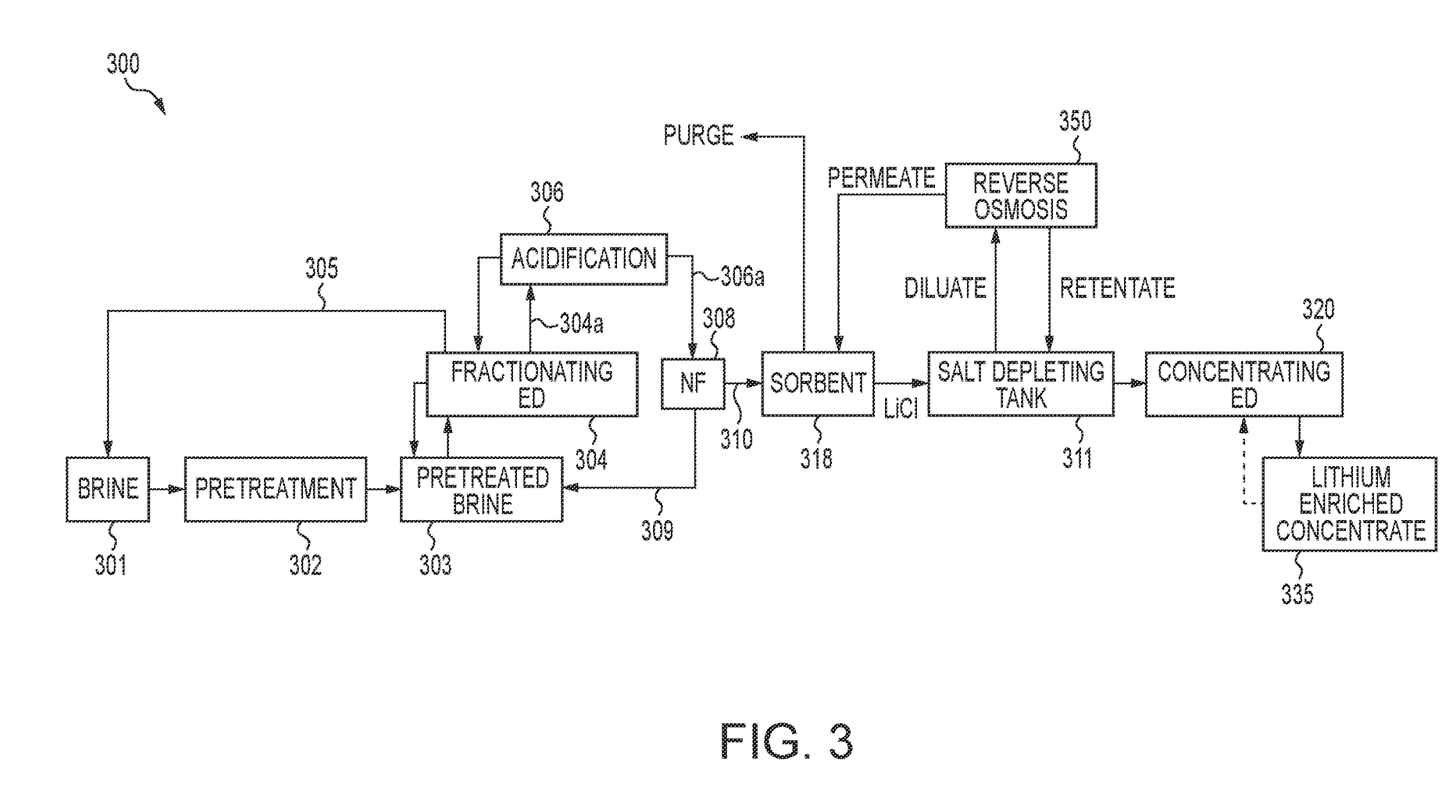
FIG. 3 represents a process flow diagram illustrating a method for producing purified and concentrated lithium chloride from a brine using a sorbent in combination with reverse osmosis.

FIG. 3 represents a process flow diagram illustrating a method 300 for producing purified and concentrated lithium chloride from a brine using a sorbent in combination with reverse osmosis. In FIG. 3, the NF permeate 310 as previously described in the context of FIG. 1 is fed to a plurality of packed beds including a selective sorbent 318. The NF permeate 310 is passed through the sorbent 318 to salt depleting tank 311. The diluate from the salt depleting tank 311 is passed to an integrated electrodialysis reverse osmosis (RO) 350 to remove water as a reverse osmosis permeate, while the resulting concentrated lithium chloride solution is returned to the salt depleting tank 311 as the reverse osmosis retentate. The permeate from the RO 350 preferably is passed back to the selective sorbent 318 to strip additional lithium from the selective sorbent 318 in the form of lithium chloride.

The feed stream from the salt depleting tank 311 is then pumped through the narrow cell compartments of the CED 320 to produce a lithium enriched concentrate 335, which is enriched in lithium cations as a lithium chloride salt in relation to the brine 301. Unlike the monovalent enriched concentrate 130, 230 of FIG. 1, FIG. 2, respectively, the lithium enriched concentrate 335 is substantially reduced in sodium and/or potassium chloride, preferably having a total concentration of sodium ions, potassium ions, or sodium and potassium ions less than 5% by weight. More preferably, the lithium enriched concentrate 335 includes a lithium concentration of at least 25,000 ppm lithium and a non-lithium monovalent ion concentration of no more 3,000 ppm. The purge stream is a sodium/potassium chloride brine relatively free of impurities.

The selective sorbent 318 is selective to lithium cations that may be removed from the sorbent as a lithium/aluminum complex with water. The sorbent may be formed by treating zeolites, resins, and the like with aluminum hydroxide. Inorganic crystalline solids, including various aluminum hydroxides, manganese oxides, and titanium oxides have been shown to be selective sorbents. A description of such selective sorbents may be found in U.S. Pat. Nos. 4,347,327 and 4,472,362, for example.

The RO 350 concentrates the lithium chloride stream from the salt depleting tank 311 to produce a more concentrated lithium chloride solution to pass to the CED 320. The permeate from the RO 350 can be supplied to the sorbent 318 as shown in the figure, or to any other step in the process that requires water (not shown). The RO 350 retentate is returned to the salt depleting tank 311.

The RO 350 preferably includes a conventional seawater reverse osmosis membrane that is preferably spiral wound. Useful RO membranes have high salt rejection and can produce potable water, <500 ppm salinity, from seawater (nominally 35 g/L) in a single pass through the membrane—thus being able to achieve up to 50% recovery of fresh water from seawater in a single pass. With 50% recovery, the salinity of the concentrated brine (reject/retentate) increases to about 70 g/L. Such RO membranes are available from DOW as part of the FILMTEC™ SW30 series, for example. The RO 350 and the CED 320 in combination provide the ability to increase lithium recoveries above 99% with the method 300.

While not shown in the figure, the lithium enriched concentrate 335 may be treated with a caustic, such as sodium hydroxide. Additional information regarding such conventional caustic treatment may be found in JP Pat. Pub. 2018-500261 A, filed Dec. 17, 2014, entitled "Production of Lithium Hydroxide". The lithium enriched concentrate 335 alternatively may be passed to an electrolysis, such as the electrolysis 221 of FIG. 2, to produce lithium hydroxide instead of lithium carbonate. This is possible because the lithium enriched concentrate 335 is substantially free of non-lithium ions that may interfere with the caustic or electrolysis reaction.

Figure 4:
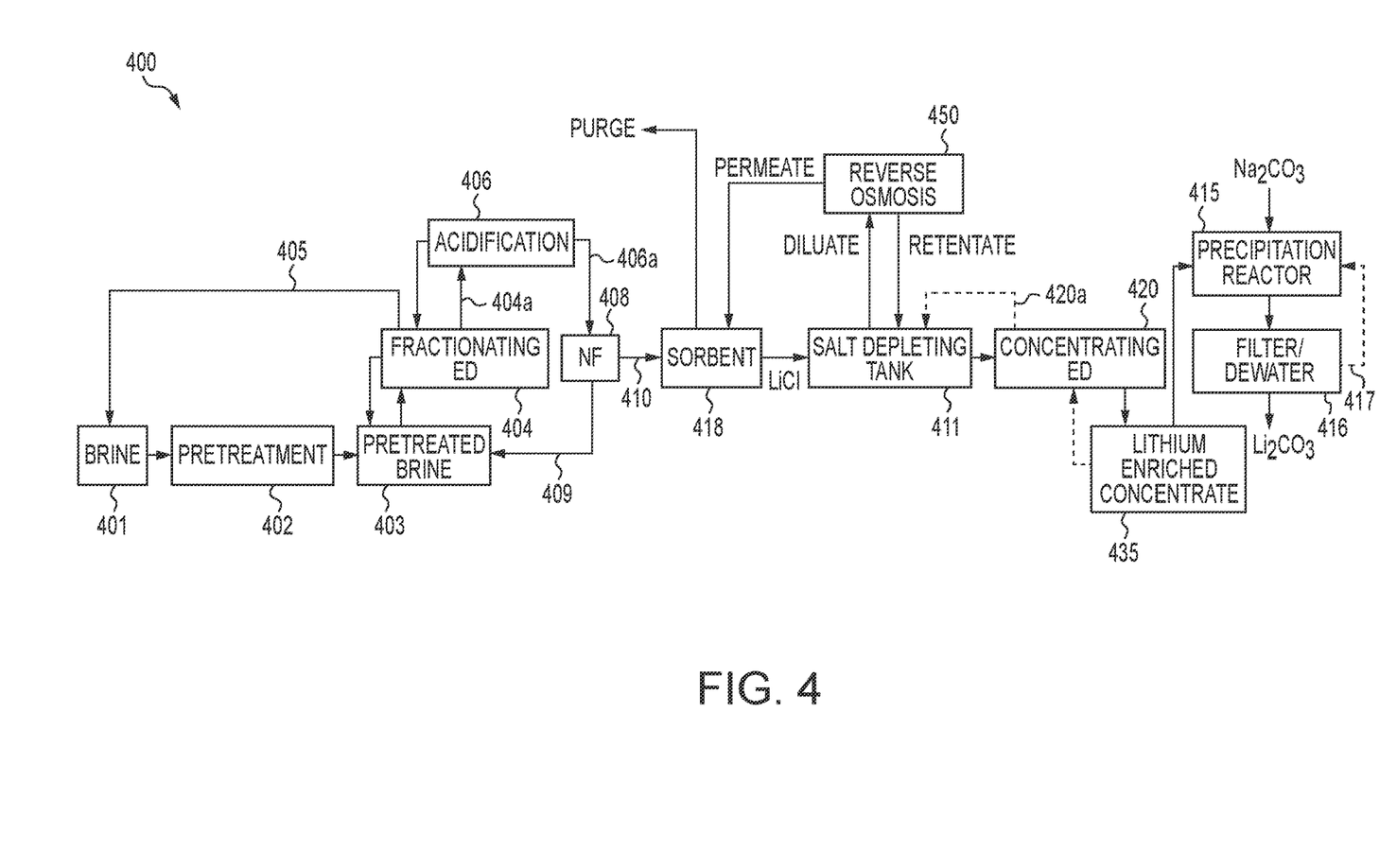
FIG. 4 represents a process flow diagram illustrating a method for producing lithium carbonate from a brine.

FIG. 4 represents a process flow diagram illustrating a method 400 for producing lithium carbonate from a brine. In FIG. 4, the lithium enriched concentrate 435 as previously described in the context of the lithium enriched concentrate 335 from FIG. 3 is fed to a precipitation reactor 415. Sodium carbonate ($Na_2CO_3$) is added to the precipitation reactor 415 to precipitate the desired lithium carbonate ($Li_2CO_3$). After addition of the sodium carbonate, the resulting lithium carbonate crystals are removed by filtration during Filter/Dewater 416. Filtrate liquid 417 resulting from the Filter/Dewater 416 may then be fed back to the precipitation reactor 415 and thus reused to form additional lithium carbonate as the filtrate liquid 417 likely remains rich in sodium carbonate that can form additional lithium carbonate.

While not shown in the figure, the lithium carbonate produced from the precipitation reactor 415 may be treated conventionally with calcium hydroxide to produce lithium hydroxide instead of lithium carbonate.

To provide a clear and more consistent understanding of the specification and claims of this application, the following definitions are provided in addition to certain terms having been defined throughout the detailed description. Unless defined otherwise herein, technical terms used in connection with the present disclosure have the same meaning as commonly understood by those of ordinary skill in the art.

Unless otherwise indicated, all numbers expressing quantities, properties such as amounts, and the like used in the specification and claims are to be understood as indicating both the explicitly provided value and as being modified by the term "about". Thus, unless indicated to the contrary, the numerical values of the specification and claims are approximations that may vary depending on the desired properties sought to be obtained and the margin of error in determining the values. At the very least, and not as an attempt to limit the application of the doctrine of equivalents to the scope of the claims, each numerical parameter should at least be construed in view of the margin of error, the number of reported significant digits, and by applying ordinary rounding techniques.

Unless the context clearly dictates otherwise, where a range of values is provided, each intervening value to the tenth of the unit of the lower limit between the lower limit and the upper limit of the range is included in the range of values.

The terms "a", "an", and "the" used in the specification claims are to be construed to cover both the singular and the plural, unless otherwise indicated or contradicted by context. No language in the specification should be construed as indicating any non-claimed element to be essential to the practice of the invention.

Described methods can be performed in any suitable order unless otherwise indicated or contradicted by context.

While various aspects of the invention are described, it will be apparent to those of ordinary skill in the art that other embodiments and implementations are possible within the scope of the invention. Accordingly, the invention is not to be restricted except considering the attached claims and their equivalents.

The invention claimed is:

1. A method of recovering and concentrating lithium from aqueous sources, the method comprising:
    processing a brine with a pretreatment to produce a pretreated brine;
    processing the pretreated brine through a fractionating electrodialysis device to produce a monovalent depleted diluate depleted in lithium chloride and a monovalent enhanced concentrate concentrated in lithium chloride;
    treating the monovalent enhanced concentrate with acid to produce an acidified monovalent enhanced concentrate;
    processing the acidified monovalent enhanced concentrate through a nanofiltration to produce a nanofiltration permeate and a nanofiltration reject; and
    producing a monovalent enriched concentrate enriched in lithium from the nanofiltration permeate.

2. The method of claim 1, where the pretreatment reduces the iron concentration of the brine.

3. The method of claim 2, where the pretreatment also reduces at least one contaminant selected from heavy metals, silica, silicates, hydrocarbons, and halogens.

4. The method of claim 1, where the pretreatment further comprises direct lithium extraction with at least one of a selective adsorbent, an ion exchange resin, and one or more precipitations.

5. The method of claim 1, where the brine is sourced from at least one of a continental brine, a natural brine, a geothermal brine, an oilfield brine, and a smackover formation brine.

6. The method of claim 1, where the fractionating electrodialysis device redistributes cations and anions of the pretreated brine between alternating membranes with a pair of electrodes, and where the fractionating electrodialysis device includes at least one monovalent anion-selective membrane and at least one monovalent cation-selective membrane.

7. The method of claim 1 further comprising recirculating a fixed volume of the pretreated brine previously fed into the fractionating electrodialysis device back into the fractionating electrodialysis device to achieve a desired degree of salt separation within the fractionating electrodialysis device.

8. The method of claim 1 further comprising maintaining a pH of the monovalent enhanced concentrate from pH 3 to pH 6 during the acid treating.

9. The method of claim 1, where the acid treating is with an acid chosen from mineral acids, carbon dioxide gas, and combinations thereof.

10. The method of claim 1 further comprising recovering valuable multivalent metals from the monovalent depleted diluate produced from the fractionating electrodialysis device.

11. The method of claim 1 further comprising returning the nanofiltration reject to the pretreated brine.

12. The method of claim 1, where the nanofiltration includes at least one nanofiltration membrane that is structurally similar to a reverse osmosis membrane, but has larger pores in a skin layer of the nanofiltration membrane and a net negative electrical charge inside individual pores of the nanofiltration membrane.

13. The method of claim 1, where the nanofiltration permeate is depleted in divalent anions and the nanofiltration reject is enriched in divalent anions.

14. The method of claim 1 further comprising passing the nanofiltration permeate to a salt depleting tank of a concentrating electrodialysis device to further concentrate the nanofiltration permeate in monovalent ions.

15. The method of claim 14 where the electrodialysis device includes two ion exchange membranes per cell pair assembly and more than one of the cell pair assemblies to increase area of the ion exchange membranes.

16. The method of claim 15 where the two ion exchange membranes are not monovalent selective membranes and have higher crosslinking and thickness in relation to homogenous ion exchange membranes used for desalination.

17. The method of claim 14 where a salt depleted solution produced from the electrodialysis device is returned to the salt depleting tank.

18. The method of claim 1, where the monovalent enriched concentrate has a lithium concentration at least twice that of the brine.

19. The method of claim 1 where the monovalent enriched concentrate has a total salt concentration from 1.1 kg/L to 1.2 kg/L.

20. The method of claim 1, where the monovalent enriched concentrate has a total concentration of iron, calcium, and magnesium less than 0.001% by weight.

21. The method of claim 1, further comprising feeding the monovalent enriched concentrate to a solvent extraction step, where the solvent extraction step uses an organic phase solvent that selectively binds lithium cations in relation to competing monovalent cations.

22. The method of claim 21 further comprising subjecting the organic phase solvent to electrolysis to produce lithium hydroxide.

23. The method of claim 22, where before subjecting the organic phase solvent to electrolysis, stripping the organic phase solvent with sulfuric acid and subjecting the resulting solution to the electrolysis to produce the lithium hydroxide and sulfuric acid.

24. The method of claim 14 further comprising feeding the nanofiltration permeate through a selective sorbent and from the selective sorbent to the salt depleting tank.

25. The method of claim 24 further comprising feeding a diluate from the salt depleting tank to an integrated electrodialysis reverse osmosis to remove water as a reverse osmosis permeate and to return the reverse osmosis retentate concentrated in lithium chloride back to the salt depleting tank.

26. The method of claim 25 further comprising passing the reverse osmosis permeate to the selective sorbent.

27. The method of claim 24, where the monovalent enriched concentrate is a lithium enriched concentrate having a concentration of sodium ions, potassium ions, or sodium and potassium ions less than 5% by weight.

28. The method of claim 24 where the monovalent enriched concentrate is a lithium enriched concentrate having a lithium concentration of at least 25,000 ppm and a non-lithium monovalent ion concentration of no greater than 3,000 ppm.

29. The method of claim 24 further comprising additional treatment of the lithium enriched concentrate where the additional treatment is selected from one or more of treating the lithium enriched concentrate with a caustic and treating the lithium enriched concentrate with electrolysis.

30. The method of claim 28 further comprising passing the lithium enriched concentrate to a precipitation reactor.

31. The method of claim 30 further comprising adding sodium carbonate to the precipitation reactor to precipitate lithium carbonate.

32. The method of claim 31 further comprising removing the lithium carbonate by filtration and passing formed filtrate liquid to the precipitation reactor to precipitate additional lithium carbonate.

33. The method of claim 31 further comprising treating the lithium carbonate with calcium hydroxide to produce lithium hydroxide.

\* \* \* \* \*